United States Patent
Jackson et al.

(10) Patent No.: US 8,556,415 B2
(45) Date of Patent: Oct. 15, 2013

(54) ADJUSTABLE NOSE PAD FOR EYEWEAR

(75) Inventors: Eleanor Wink Zimick Jackson, Erie, CO (US); Michael T. Jackson, Erie, CO (US)

(73) Assignee: Maui Jim, Inc., Peoria, IL (US)

( * ) Notice: Subject to any disclaimer, the term of this patent is extended or adjusted under 35 U.S.C. 154(b) by 258 days.

(21) Appl. No.: 13/116,529

(22) Filed: May 26, 2011

(65) Prior Publication Data

US 2012/0300169 A1   Nov. 29, 2012

(51) Int. Cl.
  *G02C 5/12* (2006.01)
(52) U.S. Cl.
  USPC ............... 351/138; 351/136; 351/137
(58) Field of Classification Search
  USPC ................ 351/136, 137, 138, 78, 80, 41
  See application file for complete search history.

(56) References Cited

U.S. PATENT DOCUMENTS

| | | | | |
|---|---|---|---|---|
| 1,393,152 | A | * | 10/1921 | Miller ........................... 351/138 |
| 2,660,924 | A | * | 12/1953 | Stegeman ....................... 351/55 |
| 4,500,179 | A | * | 2/1985 | Schonhut ....................... 351/137 |
| 4,896,957 | A | * | 1/1990 | Speer ............................ 351/137 |
| 6,045,223 | A | * | 4/2000 | Kawabata ..................... 351/137 |
| 6,582,074 | B1 | * | 6/2003 | Chen ............................ 351/136 |
| 7,753,518 | B2 | * | 7/2010 | Lam et al. ....................... 351/41 |

OTHER PUBLICATIONS

3s-Sunglasses, Adidas Eyewear Shop, www.3s-sunglasses.com, © 2011, Miller Optik GmbH, Austria, 2 pages.
Ambition, Product Information, adidas.com/eyewear, Silhouette International Schmied AG, 1 page.

* cited by examiner

*Primary Examiner* — Hung Dang
(74) *Attorney, Agent, or Firm* — Brinks Hofer Gilson & Lione

(57) ABSTRACT

An eyewear system is provided with adjustable nose pads. The nose pads are adjustable by being slidably mounted onto a portion of the nose bridge. This adjustability feature provides for wearer-selected pantoscopic angle adjustment, as well as wearer-selected fit for a particular nose and face shape. The eyewear may include plano or corrective lenses and other features of eyewear including polarized, tinted, and/or other types of lenses and lens-related features.

16 Claims, 1 Drawing Sheet

ADJUSTABLE NOSE PAD FOR EYEWEAR

TECHNICAL FIELD

Embodiments of the present invention relate to eyewear. More particularly the embodiments relate to eyewear including an adjustable fit system.

BACKGROUND

Eyewear including prescription and other corrective eyeglasses, sunglasses, and the like is an essential part of daily life for many people. People's faces come in a wide variety of shapes and sizes, such that it has historically been difficult to provide eyewear that readily fits those different faces. The width and curvature across a person's face, the size (including depth and width) of the bridge of a person's nose, relative placement of a person's eyes and ears, overall head size, and prominence of a person's brow and cheeks all affect the look and fit of eyewear. Many different shapes and styles of eyewear frames have been used over the years. In the last 20-30 year, performance sports eyewear has become increasingly popular and demanded. Many models of performance sports eyewear designed for active sports such as cycling, climbing, mountain biking, warm and cold weather extreme sports, running, and other activities utilize plastic or other polymers for the frames upon which lenses (that may be clear or tinted, prescription/corrective or plano) are mounted.

Desirable fit includes adjustment that fits to a wearer's nose bridge. For example, some people have a broad, shallow nose bridge, while others have a prominent, narrow nose bridge, or some other shape. As a matter of human anatomy, these features often correspond to one's ethnic/racial background, and certain minority populations with a particular nose bridge shape may find it difficult to obtain eyewear that fits well. Often a desirable fit includes a pantoscopic angle (between the lenses and face) that prevents unwanted contact of the lenses and or frame with one's cheeks and brow, while positioning the eyewear in a position that does not interfere with one's field of vision.

Unlike metal frames, these plastic frames typically are not easily customizable to a wearer (e.g., nose bridge, ears). In some circumstances, a desirable fit may only be achieved by custom design, or customization of an existing frame (e.g., by heating the frame until it is malleable). However, post-manufacture customization often is difficult with the nose bridge of such eyewear. Some models of eyewear mount nose pads on malleable wires attached to the bridge of the eyewear. This provides user-adjustable fit.

However, for performance sports like cycling, climbing, skiing, mountain biking, skating, or other sports where a person may fall or otherwise suffer a facial impact, the presence of metal wires in close proximity to the nose and eyes is not desirable. The possibility of injury in the event that the wire becomes broken or dislodged from the frame and/or nose pad may be greater than in frames that have only plastic or other polymer construction. Other designs that have attempted to address this have provided only an incremental (e.g., two-stage) adjustment mechanism that may not provide a wearer with a customizable fit, replacement nose pads of different sizes that may be lost, and/or other designs that may not be adjustable to someone with an asymmetrical face or other particular custom fit needs.

It may therefore be desirable to provide an adjustable nose bridge and/or nose pad system with eyewear that will allow a wearer to adjust a desired fit to his or her face (nose bridge fit, pantoscopic angle, etc.).

BRIEF SUMMARY

In one aspect, embodiments of the present invention may include a frame and nose pad configured to allow slidably adjustable movement of the nose pad relative to the frame, with a frictional engagement therebetween. In another aspect, embodiments of the present invention may include eyewear that includes a nose bridge feature that further includes one or more nose pads slidably engaged thereto.

DETAILED DESCRIPTION

Figure 1:
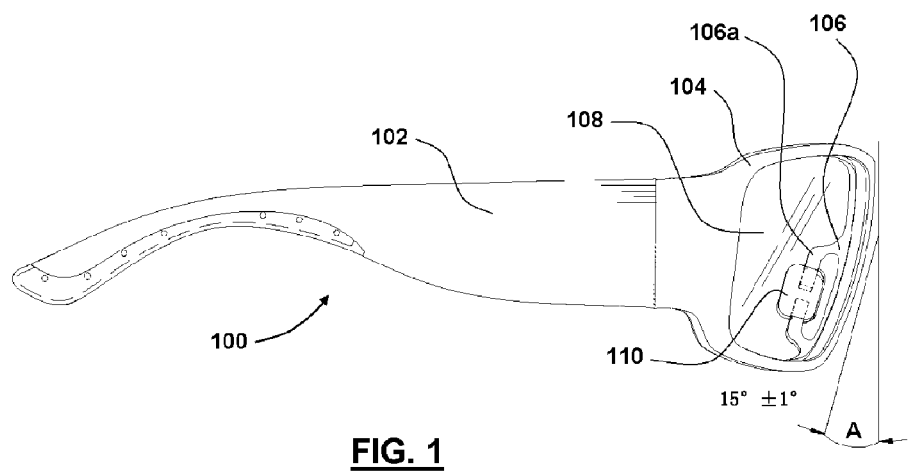
FIG. 1 shows a pair of eyeglasses including an adjustable fit eyewear system embodiment.

Embodiments are described with reference to the drawings in which like elements are generally referred to by like numerals. The relationship and functioning of the various elements of the embodiments may better be understood by reference to the following detailed description. However, embodiments are not limited to those illustrated in the drawings. It should be understood that the drawings are not necessarily to scale, and in certain instances details may have been omitted that are not necessary for an understanding of embodiments, such as—for example—conventional fabrication and assembly. It is understood that the exemplary embodiments illustrated herein may be embodied in many different forms and should not be construed as limited to the embodiments set forth herein; rather, these embodiments are provided so that this disclosure will be thorough and complete, and it will fully convey the scope to those skilled in the art. As used in this specification and the claims, the singular forms "a," "an," and "the" include plural referents unless the context clearly dictates otherwise. Any reference to the "present invention," "invention," or the like includes any and all embodiments covered by the claims.

An adjustable fit eyewear system is described with reference to FIGS. 1-2E. FIG. 1 shows an article of eyewear, embodied as a pair of sport sunglasses 100, although the eyewear may be embodied in may other styles or forms while remaining within the scope of the present invention. It should be appreciated that the side view of FIGS. 1-1B will generally be mirrored when the glasses 100 are viewed from the other side. The sunglasses 100 include a pair of temples 102 extending rearwardly from a curved polymer frame member 104 that is generally transversely disposed relative to the temples. The frame 104 includes an integral nose bridge element 106, and a pair of lenses 108. The lenses may be polarized, tinted, or otherwise configured in any manner appropriate for eyewear. Such configurations may include, for example, one or two corrective lenses that may be "prescription lenses" customized for an individual wearer, or that may be "readers" providing a predetermined adjustment to light transmission. One or both lenses may be corrective or plano, and/or may include multifocal elements (e.g., bifocals, trifocals, magnifiers, etc.). Other embodiments may include only a single lens, which may—for example—be configured as a shield-type lens known in the art.

As illustrated in FIG. 1, the lenses 108 in the frame 104 are disposed at about a 15° angle (A) relative to vertical, which may otherwise be characterized as an angle relative to a longitudinal axis defined by the temples 102 (i.e., in the illustrated embodiment, said predetermined angle is about 75°). This angle, when considered as relative to a wearer's face may be characterized as the pantoscopic angle.

The nose bridge element 106, which is integral with the bridge connecting the lenses, may be configured to include an elongate loop, the rear portion of which is configured as an engagement portion 106a that may include an open section. A nose pad element 110 is mounted slidably on the engagement portion 106a of the elongate loop formed as part of in the nose bridge 106. The nose pad element is described below in greater detail with reference to FIGS. 2A-2E. The nose pad element 110 may be configured to be installed and/or removed through the open section in the elongate loop of the nose bridge element 106. The nose pad element 110 may be constructed of silicon rubber or another flexible or semi-flexible polymer of the type useful in nose pads known in the art. Desirable materials include those that provide padding for comfortable wear, while "gripping" a wearer's face to prevent unwanted movement of the glasses—even during intense activities where perspiration and skin oils may affect the surface interface between the pads and the wearer's skin.

The nose pads 110 are configured to frictionally engage the nose bridge engagement portion 106a in a manner that allows them to slide up and down relative thereto. Each of the nose pads 110 preferably will be independently adjustable up and down, and rotatably about a long axis of the nose bridge engagement portion 106a on which it is mounted. This positional adjustment feature of nose pads 110 is configured to allow a wearer to achieve a customized fit that is much more adaptable to different nose bridge shapes than currently-available eyewear, including but not limited to, sport sunglasses, without the use of a bendable wire element that may be undesirable in sports sunglasses. Independent adjustability provides for a wearer to adapt fit to an ideal comfort level for the wearer's nose, relative ear and/or eye placement, or general desire for a fit that the wearer considers most comfortable and/or appealing. This may provide particular advantages for individuals with different body symmetry than is often accounted for in non-custom eyewear. Adjustment of the nose pads can also provide adjustability of the pantoscopic angle by up to at least one degree as illustrated in FIG. 1 as "angle A." Some embodiments may have an adjustability of more than one degree. This adjustability provides a unique ability for a wearer to achieve a desired fit that may prevent unwanted contact between the wearer's brow and/or cheeks and the glasses.

Figure 1A:
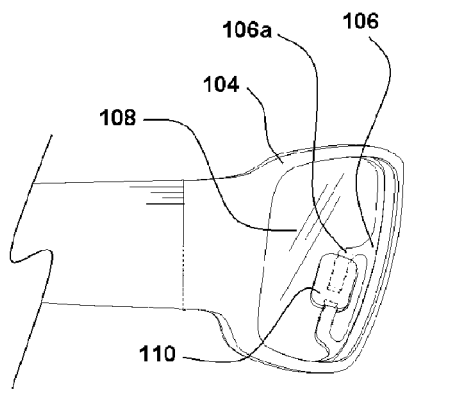
FIGS. 1A and 1B show different adjustment states of the embodiment of FIG. 1.
Figure 1B:
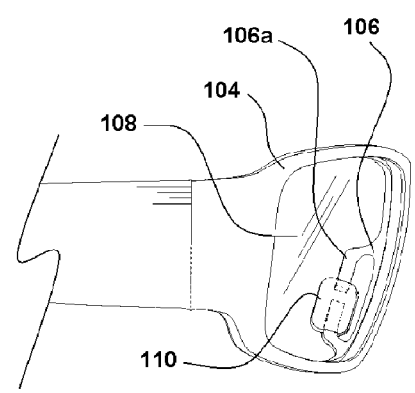

FIG. 1A shows the nose pad 110 in a raised position, and FIG. 1B shows it in a lowered position. The adjustability of nose pad 110 is gradualized and it is not incrementalized into a step-wise fashion, and the nose pads 110 can individually be adjusted up or down by as slight or great amount as desired by a wearer.

It should also be appreciated that the glasses may alternatively be embodied as "frameless," with the temples attached directly to the outer sides of lenses, and the nose bridge 106 connecting the inner sides of the lenses. A frameless configuration is well-known in the art, and those having skill in the art will readily appreciate that frameless and other glasses embodiments are enabled herein and may be practiced within the scope of the claimed embodiments.

Figure 2A:
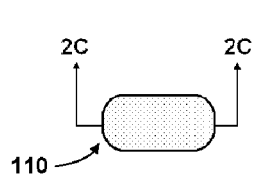
FIGS. 2A-2E show different views of a nose pad element embodiment.
Figure 2B:
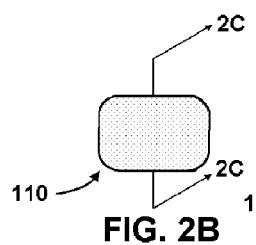

One embodiment of the nose pad element 110 is described here with reference to FIGS. 2A-2E, each of which shows different views thereof. FIGS. 2A and 2B show, respectively, top and lateral side views of the nose pad 110. The nose pad 110 is shown as being smooth, but in various embodiments, it may include a pattern or irregular surface. As with other nose pads known in the art, it may be ridged, stippled, or include other textures or contours that may enhance wearer comfort and positional stability during use. In particular, nose pad 110 may be configured to enhance grip on the surface contacting a wearer's nose. The outer contours of nose pad 110 shown in this embodiment are generally those of a rounded rectangle, but it should be appreciated that numerous other exterior shapes would function well and be practiced within the scope of the claimed embodiments.

Figure 2C:
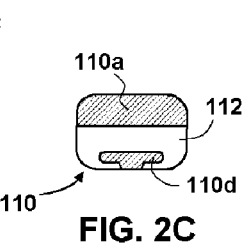
Figure 2D:
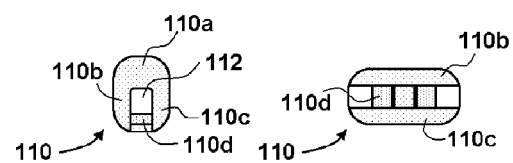

FIG. 2C shows a longitudinal section view of the nose pad 110 taken along line 2C-2C of FIGS. 2A and 2B. FIGS. 2D and 2E show, respectively, end and bottom views of the nose pad 110. The solid construction portion of the nose pad 110 is formed as a generally tubular wall structure surrounding a central longitudinal lumen 112. The wall portion defining the lumen 112 is configured to frictionally engagingly receive the engagement portion 106a of the nose bridge element 106. The frictional engagement preferably is sufficiently strong to prevent unwanted movement during wear, but will allow a wearer to move each nose pad 110 along a length of the engagement portion 106a. As shown in FIGS. 2C and 2D, a first wall section 110a is thicker than any other wall section and may be configured to function as a pad, the rear outer surface of which will rest on the nose of a wearer. The side walls 110b, 110c may be thinner than the first wall section 110 and configured to enhance the grip of the engagement portion of the nose bridge element 106.

Figure 2E:
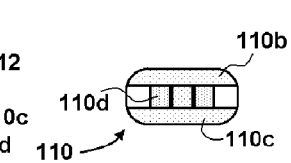

As shown in FIGS. 2C, 2D, and 2E, the bottom wall 110d includes a t-shaped cross-section and is smaller lengthwise than the first wall 110a. This construction allows it to be used for engagement with and/or removal from the engagement portion 106a of the nose bridge element's 106 elongate loop and may allow some variation of angle of the nose pad relative thereto. Specifically, this smaller portion 110 may be directed through the open space of the engagement section 106a to install and/or remove the nose pad 110. With the construction illustrated, the nose pad 110 can frictionally and slidably engage the nose bridge element 106 in a manner providing for easy adjustability by a wearer. This offers certain advantages over the need to heat and re-form polymer glasses frames and/or to provide a wire-mounted nose pad, as found in other glasses currently in use.

Those of skill in the art will appreciate that embodiments not expressly illustrated herein may be practiced within the scope of the claims, including that features described herein for different embodiments may be combined with each other and/or with currently-known or future-developed technologies while remaining within the scope of the claims presented here. Although specific terms are employed herein, they are used in a generic and descriptive sense only and not for purposes of limitation. It is therefore intended that the foregoing detailed description be regarded as illustrative rather than limiting. And, it should be understood that the following claims, including all equivalents, are intended to define the spirit and scope of this invention. Furthermore, the advantages described above are not necessarily the only advantages of the invention, and it is not necessarily expected that all of the described advantages will be achieved with every embodiment of the invention.

We claim:

1. An adjustable fit eyewear system, comprising:
   at least one nose bridge element integral with a lens-attached frame; and
   at least one nose pad element engaged frictionally and slidable around at least one engagement portion of the at least one nose bridge element;

wherein the at least one nose bridge element includes an elongate loop structure that comprises the at least one engagement portion; and wherein the elongate loop structure comprises an open section configured to allow removal of the at least one nose pad element therefrom.

2. The system of claim 1, wherein the at least one nose pad element comprises a generally tubular structure that includes a wall defining a central longitudinal lumen, the lumen configured to engagingly receive the engagement portion of the at least one nose bridge element.

3. The system of claim 2, wherein a first wall of the tubular structure is thicker than a second wall opposite the first wall.

4. The system of claim 3, wherein the second wall is configured with a t-shaped longitudinal section.

5. The system of claim 3, wherein a third wall and a fourth wall opposing each other connect the first and second walls around the central lumen.

6. The system of claim 3, wherein the first wall includes a surface configured to enhance grip on a wearer's nose.

7. The system of claim 1, wherein at least one nose pad element comprises silicon rubber.

8. An article of eyewear configured as eyeglasses and comprising the system of claim 1.

9. The article of claim 8, comprising temples and lenses.

10. The article of claim 9, where the frame connects the temples, lenses, and the at least one nose bridge element together.

11. The article of claim 9, wherein the lenses are disposed at a first predetermined angle relative to a longitudinal axis defined by the temples.

12. The article of claim 11, wherein the first predetermined angle corresponds to a first pantoscopic angle relative to a wearer's face when the article is disposed thereupon and the at least one nose pad element is disposed in a first position, and the article configured such that a second pantoscopic angle differing from the first pantoscopic angle by up to at least one degree may be achieved by sliding positional adjustment of the at least one nose pad element.

13. The article of claim 8, wherein at least one of the lenses comprised by the eyewear comprises a corrective lens element.

14. An article of eyewear comprising:
   a pair of rearwardly-extending temples connected to each other by a frame disposed generally transverse to said temples;
   at least one lens element mounted to the frame; and
   at least one nose bridge element integral with the frame, where the at least one nose bridge element further comprises at least one nose pad frictionally engaged to the at least one nose bridge element and figured to slide up and down relative thereto;
   wherein the at least one nose bridge element includes an elongate loop structure that comprises at least one engagement portion, and a portion of the at least one nose pad is frictionally engaged around the at least one engagement portion; and
   wherein the elongate loop structure comprises an open section configured to allow removal of the at least one nose pad element therefrom by passage of a portion of the at least one nose pad element through the open section.

15. The article of claim 14, wherein the at least one nose pad element comprises a generally tubular structure that includes a wall defining a central longitudinal lumen, the lumen configured to engagingly receive the engagement portion of the at least one nose bridge element.

16. The article of claim 14, configured as a pair of performance sport eyeglasses including a curved polymer frame and wherein the at least one lens element is polarized.

* * * * *